(12) United States Patent
Palmaro et al.

(10) Patent No.: US 11,887,229 B2
(45) Date of Patent: Jan. 30, 2024

(54) METHOD AND SYSTEM FOR POPULATING A DIGITAL ENVIRONMENT USING A SEMANTIC MAP

(71) Applicant: Unity IPR ApS, Copenhagen (DK)

(72) Inventors: Gregory Lionel Xavier Jean Palmaro, San Francisco, CA (US); Charles Janusz Migos, Millbrae, CA (US); Gerald James Williams Orban, New Westminster (CA); Pierre-Luc Loyer, Montréal (CA); Dominic Laflamme, Hudson (CA); Sylvio Herve Drouin, San Francisco, CA (US)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 18/087,616

(22) Filed: Dec. 22, 2022

(65) Prior Publication Data
US 2023/0274480 A1      Aug. 31, 2023

Related U.S. Application Data

(63) Continuation of application No. 17/236,954, filed on Apr. 21, 2021, now Pat. No. 11,562,517.
(Continued)

(51) Int. Cl.
*G06T 11/60*      (2006.01)
*G06T 7/11*       (2017.01)
*A63F 13/57*      (2014.01)

(52) U.S. Cl.
CPC .............. *G06T 11/60* (2013.01); *A63F 13/57* (2014.09); *G06T 7/11* (2017.01); *G06T 2207/20021* (2013.01); *G06T 2207/20081* (2013.01)

(58) Field of Classification Search
CPC .............. G06T 2207/20081; G06T 7/11; G06T 2207/20021; G06T 11/60; A63F 13/57
See application file for complete search history.

(56) References Cited

U.S. PATENT DOCUMENTS

| 6,414,679 B1 | 7/2002 | Miodonski et al. |
| 2019/0051051 A1 | 2/2019 | Kaufman et al. |

(Continued)

OTHER PUBLICATIONS

"AI Asset Management", Product Video (excerpt), 64,114 kb (.mp4 file). PromethianAI, Mar. 19, 2020. https://www.prometheanai.com/ Retrieved on Nov. 9, 2020. Retrieved from the Internet: < https:// www.youtube.com/watch?v=czV1alKNn2c&feature=emb_logo >.
(Continued)

*Primary Examiner* — Michelle L Sams
(74) *Attorney, Agent, or Firm* — Schwegman Lundberg & Woessner, P.A.

(57) ABSTRACT

A method of populating a digital environment with digital content is disclosed. Environment data describing the digital environment is accessed. Populator data describing a populator digital object is accessed. The populator data includes semantic data describing the populator digital object. The populator digital object is placed within the digital environment. A semantic map representation of the populator digital object is generated. The semantic map representation is divided into a plurality of cells. A target cell of the plurality of cells is selected as a placeholder in the digital environment for a digital object that is optionally subsequently instantiated. The selecting of the target cell is based on an analysis of the environment data, the populator data, and the semantic map representation. Placeholder data is recorded in the semantic map representation. The placeholder data includes properties corresponding to the digital object that is optionally subsequently instantiated.

20 Claims, 12 Drawing Sheets

Related U.S. Application Data

(60) Provisional application No. 63/013,482, filed on Apr. 21, 2020.

(56) References Cited

U.S. PATENT DOCUMENTS

| | | |
|---|---|---|
| 2019/0310756 A1 | 10/2019 | Vathauer et al. |
| 2021/0133850 A1 | 5/2021 | Ayush et al. |
| 2021/0327112 A1 | 10/2021 | Palmaro et al. |

OTHER PUBLICATIONS

U.S. Appl. No. 17/236,954, Non Final Office Action dated Mar. 28, 2022, 21 pgs.
U.S. Appl. No. 17/236,954, Notice of Allowance dated Sep. 16, 2022, 8 pgs.
U.S. Appl. No. 17/236,954, Response filed Aug. 29, 2022 to Non Final Office Action dated Mar. 28, 2022, 18 pgs.
"Promethian AI—Announcement Trailer", Product Video (excerpt), 82,364 kb (.mp4 file). PromethianAI, Nov. 13, 2018 https://www.prometheanai.com/ Retrieved on Nov. 9, 2020. Retrieved from the Internet: < https://www.youtube.com/watch?v=N5O-PDad2Ts&feature=emb_logo >.
"Promise", Product Video (excerpt), 167,059 kb (.mp4 file). PromethianAI, Mar. 4, 2020. https://www.prometheanai.com/ Retrieved on Nov. 9, 20209. Retrieved from the Internet: < https://www.youtube.com/watch?v=9JbfZQ177Pc&feature=emb_title >.

METHOD AND SYSTEM FOR POPULATING A DIGITAL ENVIRONMENT USING A SEMANTIC MAP

CROSS-REFERENCE TO RELATED APPLICATIONS

This application is a continuation of and claims the benefit of priority under 35 U.S.C. § 120 to U.S. patent application Ser. No. 17/236,954, filed on Apr. 21, 2021, which claims the benefit of U.S. Provisional Application No. 63/013,482, filed Apr. 21, 2020, entitled "METHOD AND SYSTEM FOR POPULATING A DIGITAL ENVIRONMENT USING A SEMANTIC MAP," each of which is incorporated by reference herein in its entirety.

TECHNICAL FIELD

The subject matter disclosed herein generally relates to the technical field of digital content generation and manipulation, and in one specific example, to computer systems and methods for populating a digital environment with digital content objects using a semantic map.

BACKGROUND OF THE INVENTION

Construction of digital environments, such as one or more scenes of a computer-implemented game having a virtual world, can be a painstaking process. For example, using a conventional digital authoring system, an author or creator of the one or more scenes may use a graphical authoring tool to select individual digital objects from a large library or collection of digital objects and then manually place each of those individual objects at particular locations within the one or more scenes. Depending on the complexity of the digital environment, an author may manually place dozens, hundreds, or even thousands of such objects to create a satisfactory digital environment.

BRIEF DESCRIPTION OF THE DRAWINGS

Features and advantages of example embodiments of the present invention will become apparent from the following detailed description, taken in combination with the appended drawings, in which.

It will be noted that throughout the appended drawings, like features are identified by like reference numerals.

DETAILED DESCRIPTION

Figure 1:
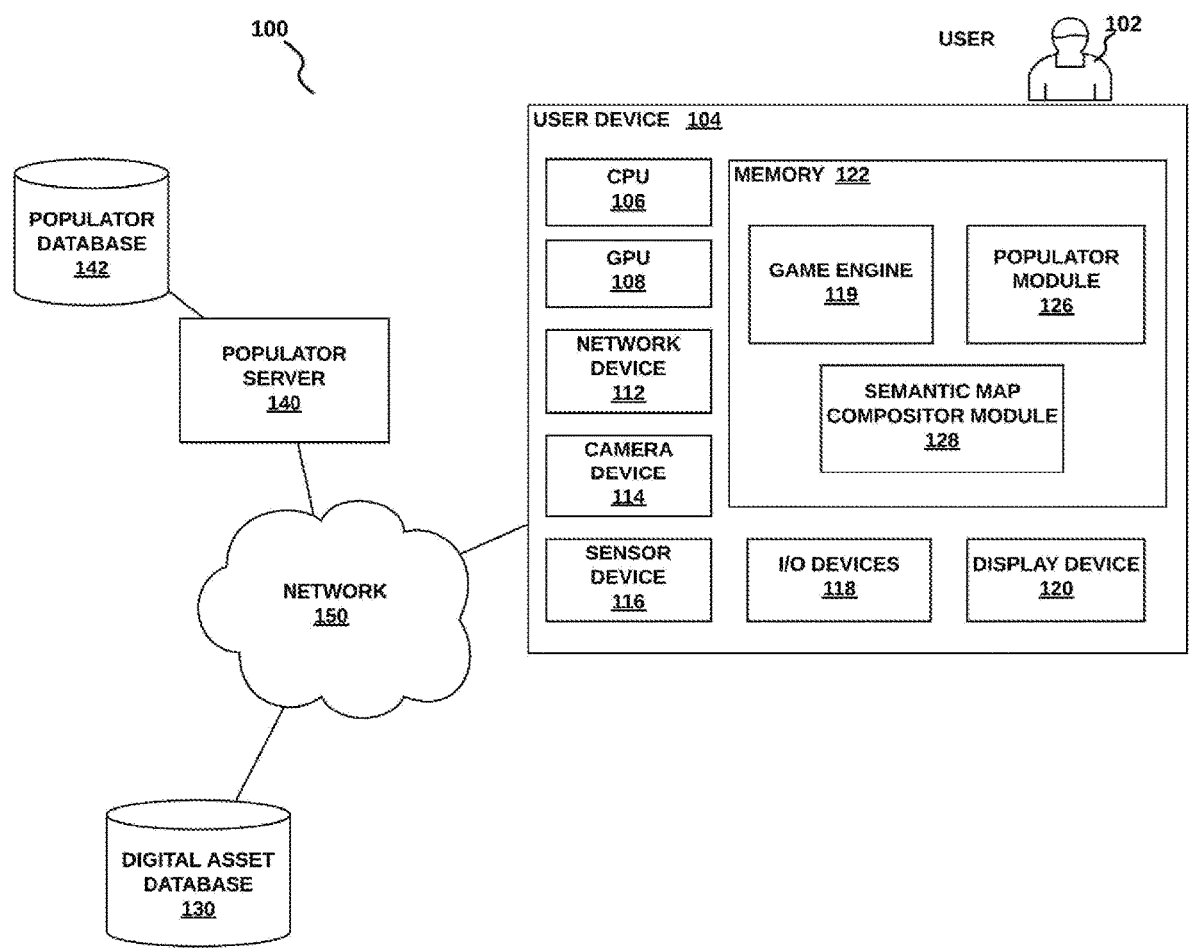
FIG. 1 is a schematic illustrating an intelligent asset import and placement system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'content' used throughout the description herein should be understood to include all forms of media including images, videos, audio, text, 3D models (e.g., including textures, materials, meshes, and more), animations, vector graphics, and the like.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'digital object', used throughout the description herein is understood to include any digital object or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including: a game, a film, a software application). For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more digital objects within a game at runtime.

The terms 'client' and 'application client' used throughout the description herein are understood to include a software client or software application that can access data and services on a server, including accessing over a network.

Throughout the description herein, the term 'mixed reality' (MR) should be understood to include all combined environments in the spectrum between reality and virtual reality (VR) including virtual reality, augmented reality (AR) and augmented virtuality.

A method of populating a digital environment with digital content is disclosed. Environment data describing the digital environment is accessed. Populator data describing a populator digital object is accessed. The populator data includes semantic data describing the populator digital object. The populator digital object is placed within the digital environment. A semantic map representation of the populator digital object is generated. The semantic map representation is divided into a plurality of cells. A target cell of the plurality of cells is selected as a placeholder in the digital environment for a digital object that is optionally subsequently instantiated. The selecting of the target cell is based on an analysis of the environment data, the populator data, and the semantic map representation. Placeholder data is recorded in the semantic map representation. The placeholder data includes properties corresponding to the digital object that is optionally subsequently instantiated.

The systems and methods described herein include one or more components or operations that are non-routine or unconventional individually or when combined with one or more additional components or operations, because, for example, they provide a number of valuable benefits to content creators. For example, the systems and methods described herein provide powerful ways of placing and organizing digital content within a scene (e.g., which may be used by a human creator to create digital environments); including use of natural language descriptions of context to generate and place content. The systems and methods as described herein provide tools (e.g., populator objects and modules, and semantic maps as described herein) to procedurally lay out content within an environment using at least a semantic description of a scene and its associated contents (e.g., objects within the scene). The systems and methods described herein using at least the semantic description to infer details about relationships between objects as well as how to add and layout additional objects within a scene.

Additionally, the systems and methods described herein simplify a 3D content creation process for users with no creative background by providing suggestions for populating a scene with digital objects (the populating including selecting the digital objects from a set of objects, and adding the digital objects to the scene, wherein the adding includes optimizing a layout of the digital objects in the scene). The systems and methods described herein allowing creators to create detailed environments with relevant content (e.g., a themed scene within a video game) in minimal time compared to fully manual processes, and then modify those environments with ease.

Turning now to the drawings, systems and methods, including non-routine or unconventional components or operations, or combinations of such components or operations, for intelligent importing and placement of digital assets in accordance with embodiments of the invention are illustrated. In accordance with an embodiment, FIG. 1 is a diagram of an example system 100 and associated devices configured to provide intelligent asset import and placement functionality. Throughout the description herein, the intelligent asset import and placement is performed by a system 100 referred to as an intelligent asset import and placement system 100, or "Populator System" 100 for short. In accordance with an embodiment, the populator system 100 can be configured to intelligently import and place digital objects within a digital environment in order to populate the digital environment with the digital objects. In the example embodiment, the populator system 100 includes a user device 104 (e.g., operated by a user 102), an asset database 130, and a populator server 140 coupled in networked communication via a network 150 (e.g., a cellular network, a Wi-Fi network, the Internet, and so forth). In some embodiments, the user device 104 may be a mobile computing device, such as a smartphone, a tablet computer, a laptop computer, a head mounted virtual reality (VR) device or a head mounted augmented reality (AR) device. In other embodiments, the user device 104 may be a computing device such as a desktop computer.

In accordance with an embodiment, the user device 104 includes one or more central processing units (CPUs) 106 and graphics processing units (GPUs) 108. The processing device 106 is any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein (e.g., in reference to FIG. 2A, FIG. 2B, FIG. 3, FIG. 4, FIG. 5, FIG. 6A, FIG. 6B, FIG. 6C, and FIG. 6D). The user device 104 also includes one or more networking devices 112 (e.g., wired or wireless network adapters) for communicating across the network 150. The user device 104 may further include one or more camera devices 114 which may be configured to capture digital video of the real world near the user device 104 during operation. The user device 104 may also include one or more sensors 116, such as a global positioning system (GPS) receiver (e.g., for determining a GPS location of the user device 104), biometric sensors (e.g., for capturing biometric data of the user 102), motion or position sensors (e.g., for capturing position data of the user 102 or other objects), or an audio microphone (e.g., for capturing sound data). Some sensors 116 may be external to the user device 104, and may be configured to wirelessly communicate with the user device 104 (e.g., such as used in the Microsoft Kinect®, Vive Tracker™, MIT's Lidar sensor, or MIT's wireless emotion detector).

The user device 104 may also include one or more input devices 118. The input device 118 is any type of input unit such as a mouse, a keyboard, a keypad, pointing device, a touchscreen, a microphone, a camera, a hand-held device (e.g., hand motion tracking device) and the like, for inputting information in the form of a data signal readable by the processing device 106. The user device 104 further includes one or more display devices 120, such as a touchscreen of a tablet or smartphone, or lenses or visor of a VR or AR HMD, which may be configured to display virtual objects to the user 102 in conjunction with a real world view. The display device 120 may be driven or controlled by one or more GPUs 108. The GPU 108 processes aspects of graphical output that assists in speeding up rendering of output through the display device 120.

In accordance with an embodiment, the memory 122 may be configured to store a client intelligent asset import and placement system module (also referred to as a "client module" 126 or a "Populator module" 126). The memory 122 can be any type of memory device, such as random access memory, read only or rewritable memory, internal processor caches, and the like. The memory may also store a game engine 119 (e.g., executed by the CPU 106 or GPU 108) that communicates with the display device 120 and also with other hardware such as the input/output device(s) 118 to present a digital environment (e.g., a 3D or 2D video game environment) or a 3D/2D digital content creation environment to the user 102. The game engine would typically include one or more modules that provide the following: simulation of a virtual environment and digital objects therein (e.g., including animation of digital objects, animation physics for digital objects, collision detection for digital objects, and the like), rendering of the virtual environment and the digital objects therein, networking, sound, and the like in order to provide the user with a complete or partial virtual environment (e.g., including video game environment or simulation environment) via the display device 120. In accordance with an embodiment, the simulation and rendering of the virtual environment may be decoupled, each being performed independently and concurrently, such that the rendering step always uses a recent state of the virtual environment and current settings of the virtual scene to generate a visual representation at an interactive frame rate and, independently thereof, the simulation step updates the state of at least some of the digital objects (e.g., at another rate).

In accordance with an embodiment, the populator module 126 may be configured to perform a series of tasks or operations, including one or more non-routine tasks or operations or one or more combinations of tasks and operations, as described herein in reference to FIG. 2A, FIG. 2B, FIG. 3, FIG. 4, FIG. 5, FIG. 6A, FIG. 6B, FIG. 6C, and FIG. 6D).

In accordance with an embodiment, the memory 122 may also include a semantic map compositor module 128 configured to perform a series of tasks or operations, including one or more non-routine tasks or operations or one or more non-routine combinations of tasks and operations, as described herein in reference to FIG. 2A, FIG. 2B, FIG. 3, FIG. 4, FIG. 5, FIG. 6A, FIG. 6B, FIG. 6C, and FIG. 6D).

Further, the populator system 100 may include a server 140 which includes a memory (not shown) storing a populator server module 134. During operation, the populator module 126 and the populator server module 134 perform the various populator functionalities (e.g., intelligent asset importing and placement) described herein. More specifically, in some embodiments, some functionality may be implemented within the client module 126 and other functionality may be implemented within the server module 134. In accordance with an embodiment, the populator server 140 may communicate with a populator database 142 as described herein in reference to FIG. 2A, FIG. 2B, FIG. 3, FIG. 4, FIG. 5, FIG. 6A, FIG. 6B, FIG. 6C, and FIG. 6D). In accordance with an embodiment, the populator database 142 may include data describing a plurality of configurations for a populator module 126 (e.g., such that the populator module 126 can be used in different environments). For example, the populator database 142 may include configurations for different populator module types which can be used to populate different environments (or parts thereof). In accordance with an embodiment, the populator database 142 may include semantic data associated with a populator module 126 (e.g., property or trait data as described below in operations 222, 224, and 228).

In accordance with an embodiment, the populator module 126 can be configured (e.g., as described with respect to FIG. 2A, FIG. 2B, FIG. 3 and FIG. 4) to create and modify a semantic map of an environment, and help populate the environment with digital objects using the semantic map, wherein the semantic map includes contextual information of the environment and the digital objects therein. In accordance with an embodiment, the semantic map is a high level description of an environment (or part thereof). In accordance with the methods described herein with respect to FIG. 2A, FIG. 2B, FIG. 3 FIG. 4, FIG. 5, FIG. 6A, FIG. 6B, FIG. 6C, and FIG. 6D, the populator module 126 may be configured to generate the semantic map for an environment (e.g., along with a semantic map compositor module 128) using context dependent layouting strategies which may include rule based strategies, L-systems, Grammar, Wave Function Collapse and Neural Networks. The high level description of the environment is referred to herein as a semantic map.

In accordance with an embodiment, a populator module 126 may be associated with a digital object, and when associated with a digital object, the digital object may be referred to herein as a populator object. The populator object may be any type of digital object which can occupy space within an environment. For example, a populator object may be a desk, a room, a house, a car, a forest, and more. In accordance with an embodiment, a semantic map which is associated with a populator module 126 is also associated with a populator object associated with the populator module 126, wherein the semantic map is referred to herein as a local semantic map (e.g., localized to the populator object). In accordance with an embodiment, a local semantic map of a populator object may represent (e.g., be a mapping of) an area or volume associated with the populator object. For example, the local semantic map may be a 3D map that represents a 3D volume associated with the populator object within the environment. As another example, the local semantic map may be a 2D map that represents a 2D slice of a 3D volume associated with the populator object within the environment (e.g., a local semantic map may be similar to a floor plan of a 3D room, or a desktop layout of a surface of a 3D desk). In accordance with an embodiment, and further described below (e.g., with respect to FIG. 3), a populator object may have an associated topology which is associated with the local semantic map of the populator object (e.g., associated with a volume or area occupied by the populator object.

In accordance with an embodiment, a populator module 126 and associated populator object may be referred to in combination herein as 'a populator'.

In accordance with an embodiment, a populator may be associated with one or more properties or traits, wherein a property or trait of the one or more properties or traits includes semantic data which may be used during operation by the populator (e.g., used by a populator module 126 associated with the populator) to select and place digital assets within the populator object within an environment. In accordance with an embodiment, the semantic data of a trait may be associated with an environment, with a populator object, or both. In accordance with an embodiment, a trait includes data describing one or more concepts that may be used by the populator to determine contextual information related to an environment or situation. For example, a populator which includes a 3D digital bedroom populator object may include a "bedroom trait" which includes data describing concepts related to a bedroom, which may include a list of digital objects with high probability of being in a bedroom, relational data describing relationships between digital objects within a bedroom (e.g., proximity, orientation), additional traits related to a bedroom (e.g., 'house', 'bed', 'room' and more), and more. In accordance with an embodiment, the data associated with a trait may include semantic data from an ontological database (e.g., including related words, concepts, properties and relationships). In accordance with an embodiment, a populator may communicate with a first database (e.g., a populator database 142 for example as described in operation 230) that includes trait data related to the one or more traits of the populator, helping the populator module 126 to instantiate objects within the populator object within environment (e.g., as described in operation 406). In accordance with an embodiment, the populator (e.g., the populator module 126) may query the same, or an additional database (e.g., the asset database 130) for digital objects related to the one or more traits (e.g., as described in operation 308); for example, based on a bedroom populator (e.g., which may include a populator object which is a 3D digital model of a bedroom) that includes bedroom traits, the bedroom populator may query the asset database 130 for digital objects that are associated with a bedroom (e.g., digital objects which may be associated with semantic data relating to a concept of a bedroom).

In accordance with an embodiment, while shown in FIG. 1 as a single populator module 126, a populator system 100 may include a plurality of populator modules 126 (e.g., and associated populator objects) that may interact with each other (e.g., sharing data such as traits, and more). For example, a first populator module may be nested within a second populator module, whereby the first populator module may inherit one or more traits from the second populator module, and wherein the second populator module may also inherit one or more traits from the first populator module. In accordance with an embodiment, the nesting may occur when a first populator object (e.g., associated with the first populator module) is physically located within a second populator object (e.g., associated with the second populator module). For example, a first 'bedroom' populator object may be nested within (e.g., physically placed within) a second populator object such as a 'cabin' populator object, a 'townhome' populator object, a 'mansion' populator object, and the like, and may inherit associated traits from the second populator object (e.g., and wherein the second populator object may also inherit traits associated with the first populator object). Accordingly, the nested first and second objects may operate differently based on the inherited traits (e.g., a bedroom populator object may operate differently based inheriting traits from a 'cabin' populator object, a 'townhome' populator object and a 'mansion' populator object). In accordance with an embodiment, and shown in FIG. 2A, FIG. 2B, FIG. 3, and FIG. 4, a plurality of populator modules 126 may interact with each other by contributing data to and receiving data from a single composited semantic map.

In accordance with an embodiment, a populator module 126 whose associated populator object is within an environment (e.g., a cabin populator object within a forest environment) may include and may receive contextual data (e.g., including trait data and additional semantic data) associated with the environment (e.g., via an environment label which can be readily be connected via ontological information with one or more known concepts, such as 'forest', 'beach', 'kitchen', 'bedroom' and the like), wherein the contextual data is used to determine specific digital assets to spawn in the populator object and which may be related to the contextual data (e.g., as described with respect to operation 406). In accordance with an embodiment, the contextual data may be predefined and stored in a database (e.g., within the digital asset database 130 and the populator database 142).

In accordance with an embodiment, a semantic map includes data that may be used by a populator module 126 (e.g., as described with respect to FIG. 2A, FIG. 2B, FIG. 3, and FIG. 4) to select and place (e.g., orient) digital assets within an associated populator object (e.g., wherein the associated populator object is within an environment). In accordance with an embodiment, a semantic map is a map of an environment (or a part of an environment) that includes regions (e.g., volumes or 2D areas) with semantic information associated with the environment and also may include references to digital objects therein. In accordance with an embodiment, a semantic map may be a map of a populator object. In accordance with an embodiment, a region within a semantic map may have a fuzzy border when in contact with an additional region, wherein the fuzzy border represents a graded change in semantic data from the region to the additional region. In accordance with an embodiment, the fuzzy border may itself be a region between two or more regions. In accordance with an embodiment, the fuzzy border may include a variable weight value for each point within the fuzzy border region that represents a weighting factor for semantic data at the point (e.g., representing a measure of importance of semantic data associated with regions bordering the fuzzy border. In accordance with an embodiment, a populator module 126 builds a semantic map for its associated populator object and then uses the semantic map to "request" digital objects for placement at selected places within the populator object (e.g., as described below with respect to FIG. 2A, FIG. 2B, FIG. 3, and FIG. 4). In accordance with an embodiment, data within a semantic map is used to determine a size and orientation for the placed digital object (e.g., as described in operation 308). Accordingly, a semantic map includes data which a populator module 126 may use to determine a layout for a populator object including a determination of types of digital assets to be placed within a region of the populator object.

In accordance with an embodiment, a plurality of semantic map regions and/or semantic maps can be blended and composited (e.g., layerer) into a single composited semantic map by the semantic map compositor module 128 (e.g., as described with respect to FIG. 2A, FIG. 2B, FIG. 3, and FIG. 4). In accordance with an embodiment, the compositing may be due to a nesting of a first populator object with a second populator object. In accordance with an embodiment, a populator module 126 can use fuzzy logic on a composited semantic map to place digital objects with a fuzzy context (e.g., using fuzzy logic to determine digital objects that match a blended semantic map). In accordance with an embodiment, a semantic map compositor module 128 may determine (e.g., during a compositing of two or more regions) semantic information for a border between two or more regions based on applying predefined rules to the semantic information in the two regions, or applying a trained AI agent which has been trained to determine semantic information for a border between two or more regions (the training using data from a plurality of semantic regions), or using data within a database (e.g., a populator database 142, an asset database 130, or the like) that includes semantic information related to overlapping semantic regions. For example, when a water semantic region and a grass semantic region overlap, a semantic map compositor module 126 may determine that the overlap region is a shore (or beach) and digital objects associated with a shore should be placed there (e.g., even though no direct description of a shore was provided to the module 128). In accordance with an embodiment, a change in a first region may affect a second region with which it is composited. Based on a first and a second region being composited, a change in the first region may determine a change in the second region. For example, if a first semantic region of a populator is a desert and it contains an additional composited semantic region for a house, then based on the first semantic region being converted into a city (e.g., by a user) the composited semantic region of the house may change and trigger a rebuild of a populator object associated with the populator from a desert environment to a city environment.

During operation, for a given environment, a composited semantic map may represent a ground truth for all objects to be spawned in the environment by a populator module 126. The semantic map compositor module 128 may contain logic that combines a plurality of local semantic maps from a plurality of populator modules 126 and allows the populator modules 126 to spawn assets into the environment (e.g., within the associated populator object) based in part on the composited semantic map. In accordance with an embodiment, each item in the composited semantic map has an associated in-scene digital object. In accordance with an embodiment, based on a populator module 126 updating their associated local semantic map with changes, the semantic map compositor module 128 may reconcile the changes by adding, deleting, and modifying objects as necessary to a composited semantic map (e.g., as described in detail with respect to FIG. 4). This allows for non-destructive workflows where objects can be removed from and then added back to an environment based on changes to the composited semantic map as described with respect to FIG. 4.

Figure 2A:
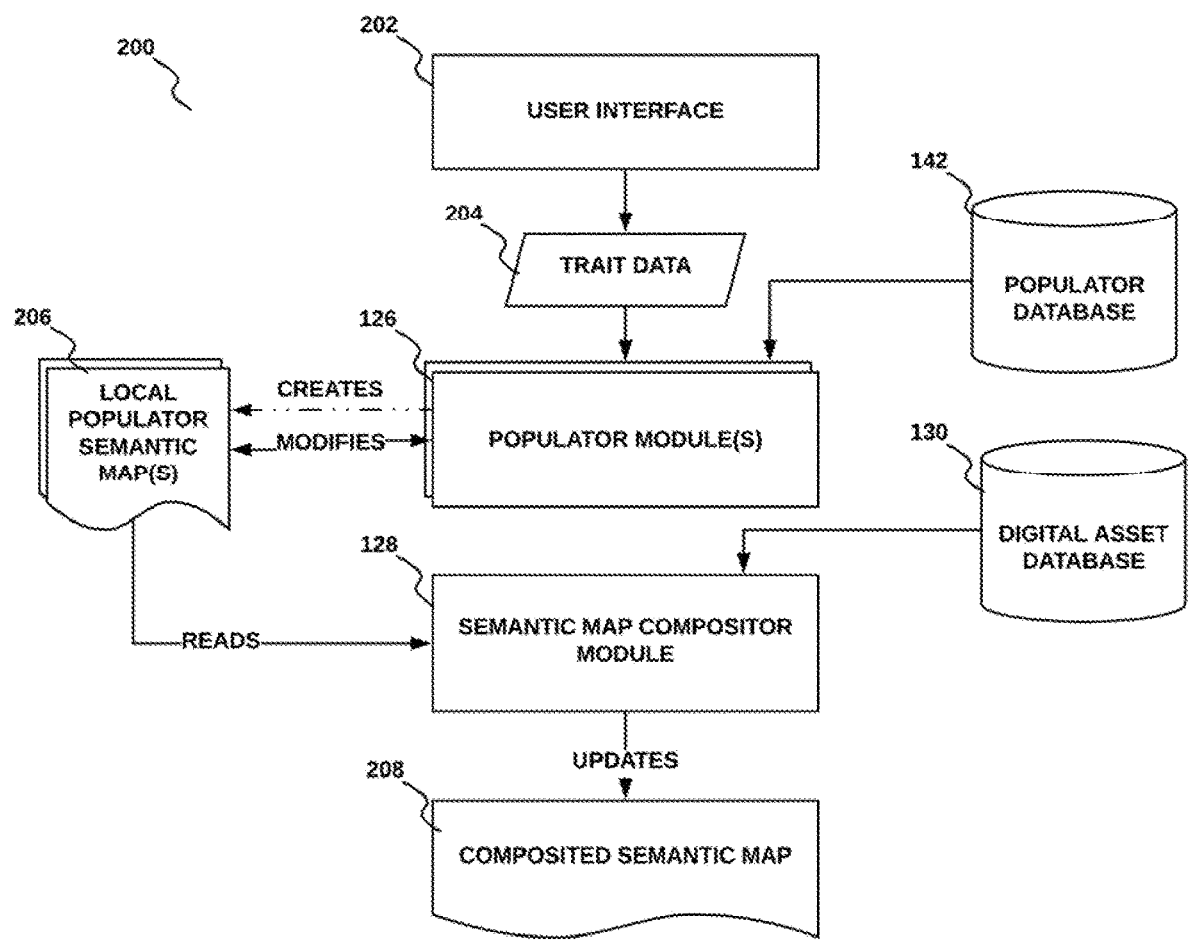
FIG. 2A is a schematic illustrating a data flow diagram of an intelligent asset import and placement system, in accordance with one embodiment.

In accordance with an embodiment, and shown in FIG. 2A is an illustration of data flow and communication between modules and databases in a populator system 100. Further details of the data flow and communication is described in reference to FIG. 2B below. In accordance with an embodiment, there is provided a user interface 202 which may be interacted with by the user 102. In accordance with an embodiment, the user interface 202 may receive trait data 204 from the user 102 (e.g., as part of operation 222 described below) and pass the trait data 204 to one or more populator modules 126. In accordance with an embodiment, the user interface 202 may be used to perform one or more of the following: trigger a shuffle request (e.g., as described with respect to operation 330), change a topology (e.g., as described in operation 332), and manipulate an object in a scene within a populator (e.g., as described in operation 336). In accordance with an embodiment, as described in the method 300 (e.g., described below with respect to FIG. 3), each one of the one or more populator modules 126 may create and modify a local semantic map 206 associated with a populator object within the environment (or part of the environment), wherein the creating and modifying may be based on the received trait data 204. In accordance with an embodiment, the populator module 126 may download additional populator data from the populator database 142. In accordance with an embodiment, the populator module 126 may download a second populator module 126 associated with a second (e.g., nested) populator object. As shown in FIG. 2A, there may be a plurality of local semantic maps created by the one or more populator modules 126 (e.g., each local semantic map may be created by a different populator module 126). In accordance with an embodiment, a semantic map compositor module 128 uses a method 400 (described below with respect to FIG. 4) to read data from the plurality of local semantic maps 206 to create and modify a single composited semantic map 208 for the environment (e.g., or for a root populator object which contains a plurality of nested populator objects associated with the plurality of local semantic maps). In accordance with an embodiment, and as part of the method 400, the semantic map compositor module 128 may also communicate with a digital asset database 130 to request asset data for a digital object associated with the trait data 204, and then instantiate the digital object within the environment (e.g., within a populator object) based in part on the composited semantic map 208, as described in detail in the method 400.

Figure 2B:
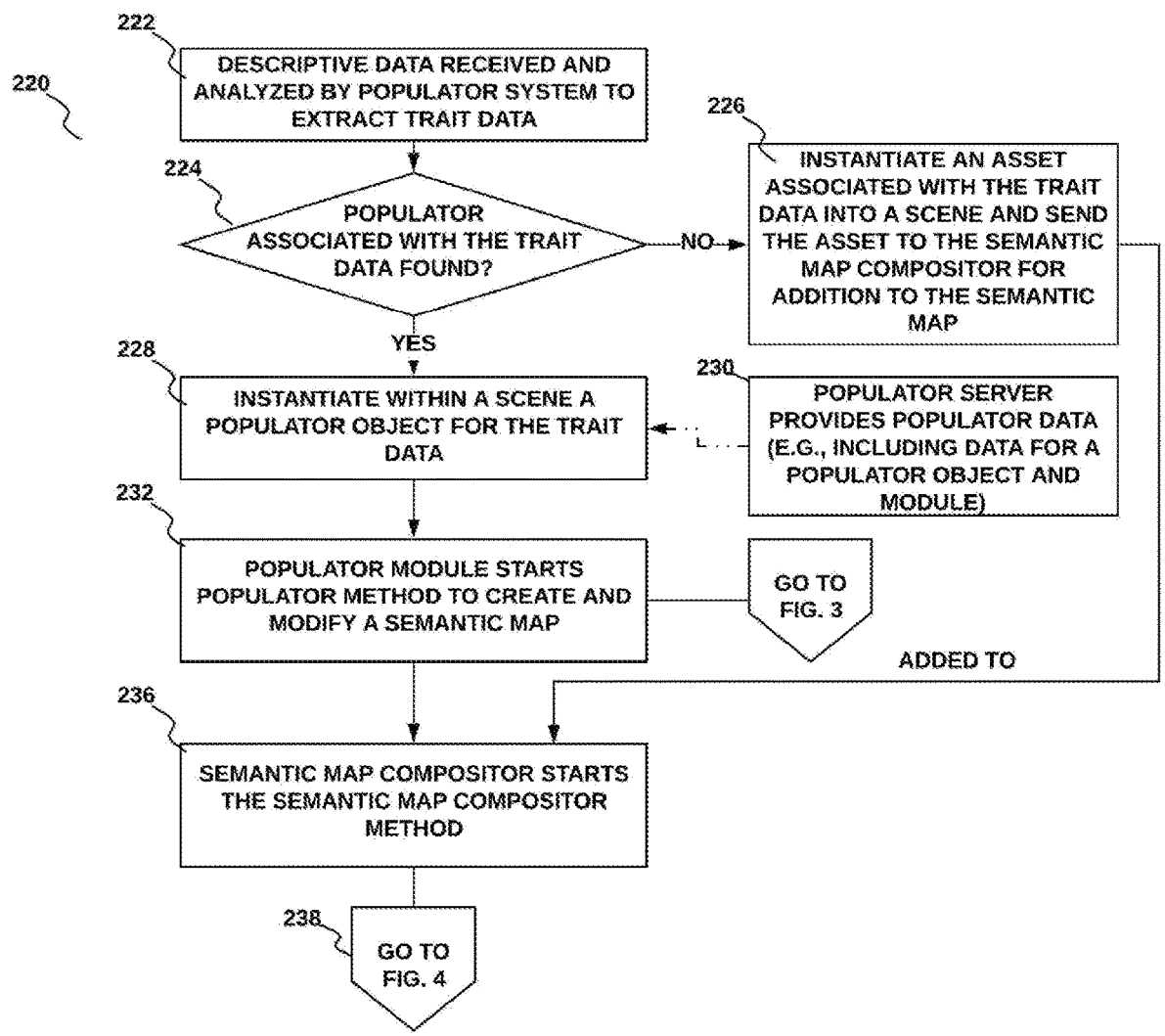
FIG. 2B is a schematic illustrating a method for importing digital assets into a digital environment using an intelligent asset import and placement system, in accordance with one embodiment.

In accordance with an embodiment, and shown in FIG. 2B is a method 220 for selecting and placing a digital object within an environment (e.g., within a populator object) using a populator system 100. The environment may be a digital scene being created within a 3D creation development tool (e.g., by a user). In accordance with an embodiment, at operation 222 of the method 220, descriptive data may be received by the populator module 126 (e.g., via the user interface 202). The descriptive data may be text (or voice commands) input by a user creating the digital scene (e.g., for a video game or digital movie), wherein the descriptive data is a description of an element within the scene, or an element which may be added to the scene. In accordance with an embodiment, the input descriptive data may be analyzed (e.g., by a populator module 126) to extract trait data. For example, the analysis may include natural language processing to determine trait data 204 from within the input. For example, the user may input the word 'Forest' when trying to create a digital forest environment. At operation 224 of the method 220, the populator module 126 searches for a populator object associated with the determined trait data 204 (e.g., searches a local memory 122 and/or searches a networked database 142). In accordance with an embodiment, at operation 226, based on no populator object being found, the populator module 126 may perform a search (e.g., within the digital asset database 130) for a digital asset associated with the determined trait data 204, and furthermore may instantiate any found digital asset into the environment as a digital object. In this case, the instantiated digital object may be added to the composited semantic map (e.g., in operation 236), but may not have an orientation, size or position determined by the populator (e.g., it may have a default orientation, size or position).

Figure 4:
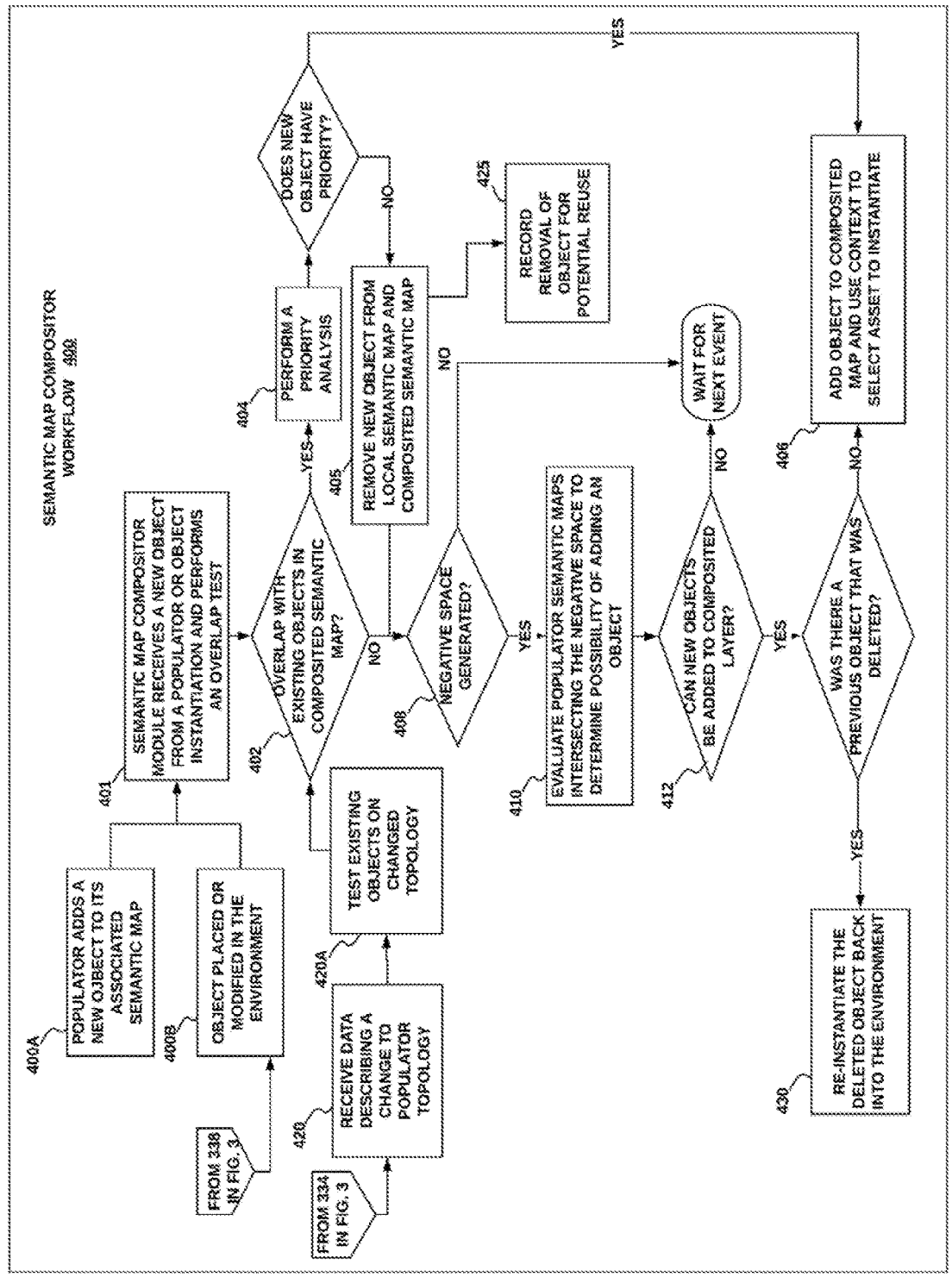
FIG. 4 is a flowchart illustrating a method for compositing a semantic map with an intelligent asset import and placement system, in accordance with an embodiment.

Furthermore, as part of operation 226, the instantiated asset is sent to the semantic map compositor module 128 for addition to the composited semantic map 208 (e.g., described with respect to operation 400B in FIG. 4).

In accordance with an embodiment, at operation 228 of the method 220, based on finding of a populator object associated with the determined trait data 204, the populator object is instantiated in the environment (e.g., within a scene). In accordance with an embodiment, the populator object may be instantiated within the environment with an initial set of digital objects related to additional traits associated with the populator object. For example, based on a bedroom populator object being found, the found bedroom populator object may be instantiated into the environment with the bedroom populator object including an initial set of bedroom objects (e.g., a bed, a mirror, a dresser, a closet, a desk, and the like) in a layout that resembles a bedroom. In accordance with an embodiment, at operation 232 of the method 220, the populator module 126 starts a populator method 300 to create and modify a local semantic map 206 associated with the populator object. The populator method 300 is described in detail with respect to FIG. 3 below. As part of the populator method 300, the populator module 126 creates and modifies a local semantic map 206 by adding or subtracting one or more digital objects to the map. In accordance with an embodiment, as part of operation 228, at operation 230, populator data may be provided to a populator module 126 from the populator server 140 and populator database 142. The populator data may include data describing a populator object and a populator module associated with the determined trait data.

In accordance with an embodiment, at operation 236 of the method 220, a semantic map compositor module 128 performs a semantic map compositor method 400. In accordance with an embodiment, as part of the compositor method 400, the semantic map compositor module 128 reads a plurality of local semantic maps 206 (e.g., as created within the populator method 300), creates and modifies a composited semantic map 208 which combines data from the plurality of local semantic maps 206, uses the composited semantic map 208 to select a digital asset (e.g., the selection based at least on data from the composited semantic map as described throughout FIG. 3 and FIG. 4), spawns (e.g., instantiates) the selected digital asset in the environment, and adds data associated with the spawned digital asset to the composited map. The compositor method 400 is described in detail in reference to FIG. 4.

Figure 3:
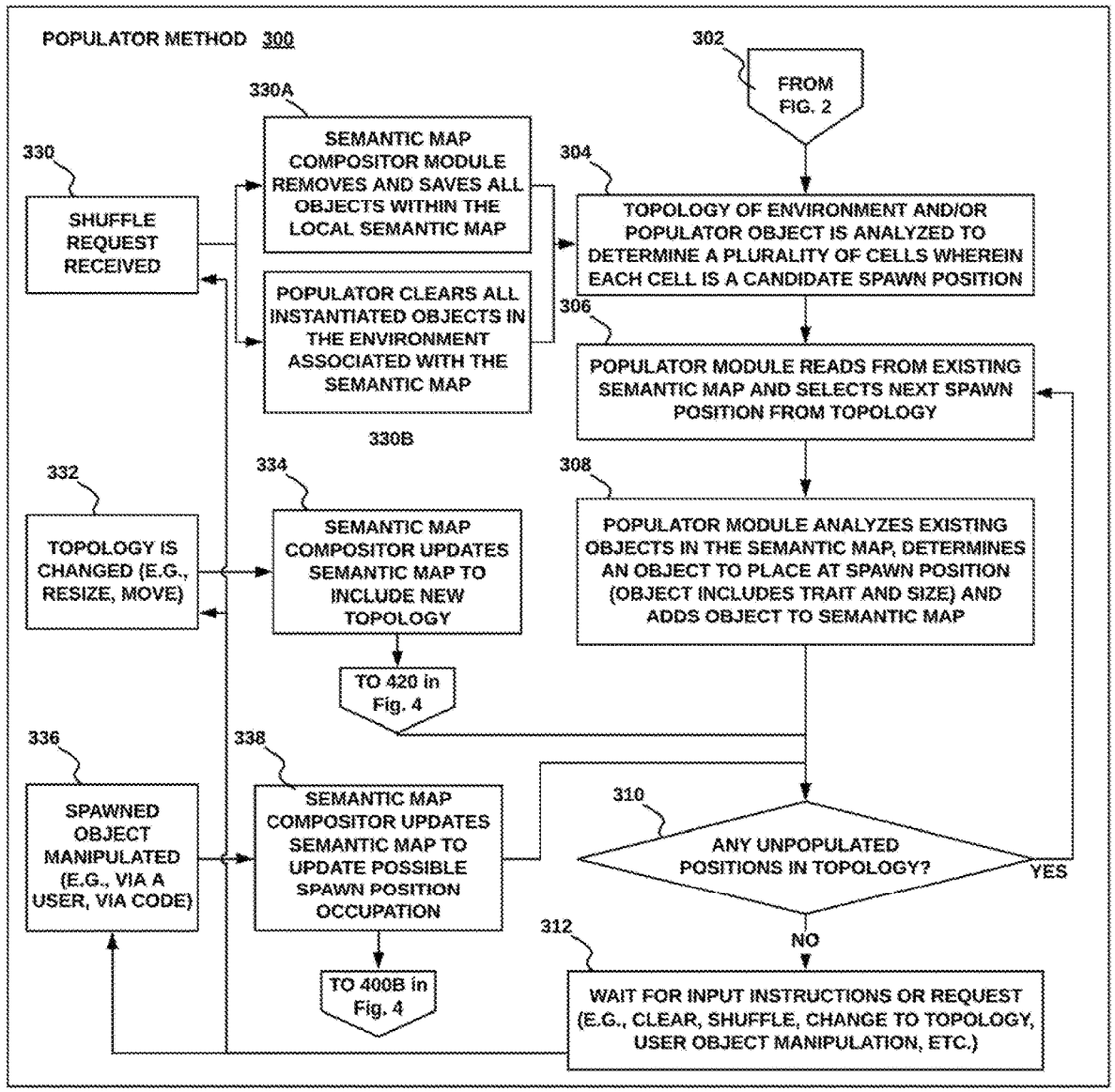
FIG. 3 is a flowchart illustrating a method for populating a semantic map with an intelligent asset import and placement system, in accordance with an embodiment.

In accordance with an embodiment, and as shown in FIG. 3 is a method 300 for a populator module 126 to select and place a digital object in an environment within a populator object associated with the populator module 126. In accordance with an embodiment, at operation 304 of the method 300, data describing a topology of the populator object is received and analyzed. In accordance with an embodiment, the topology of the populator object may be modified by the environment surrounding the populator object. The analysis may include a dividing of the topology into a plurality of cells, wherein a cell is a volume (or area if the topology is a surface) wherein a digital asset may be spawned or placed. In accordance with an embodiment, a cell from the plurality of cells may include data describing a position and shape of the cell. The topology may be divided into the plurality of cells for the benefit of minimizing problems associated with a change in topology (e.g., a change in size and/or shape of a populator object which may necessitate changes of instantiated objects therein, as described in operation 332). In accordance with an embodiment, based on a change in topology, a cell from a first topology (e.g., before the change in topology) may be mapped to an associated cell in a second topology (e.g., after the change in topology). In accordance with an embodiment, a topology may be any spatial representation and may be manipulated (e.g., changed by a user on a user interface via a mouse, touch screen, or other input). In accordance with an embodiment, a cell of the plurality of cells may map to a position and volume (e.g., or area) in the environment (e.g., within the populator object), and to a position and volume (or area) in a semantic map associated with the environment. In accordance with an embodiment, a cell of the plurality of cells may be linked directly to a data oriented programming object which allows for data oriented processing and jobification to parallelize processing of semantic maps.

In accordance with an embodiment, as part of operation 304, a populator module 126 may discretize (e.g., divide into cells) a topology within the environment, wherein the topology within the environment is associated with a volume or area occupied by a populator object associated with the populator module 126. In accordance with an embodiment, a topology can be user defined and may or may not be bound to a grid. In accordance with an embodiment, the topology may be freeform and the populator module 126 may provide tools (e.g., a set of handles on a topology within a user interface) to allow users to manipulate and modify the topology. In accordance with an embodiment, the structure of a topology may include a regular 2D/3D grid, a 2D polygonal area (convex, concave, including holes, and the like), a line network, a free form 2D/3D space, a spline, a user defined topology, and more.

In accordance with an embodiment, at operation 306 of the method 300, the populator module 126 reads data from a local semantic map 206 (e.g., associated with the populator module 126) and/or a composited semantic map 208, analyzes the data from the semantic maps and selects a spawn position (e.g., a cell from the plurality of cells) from the received topology. The analysis of the local and composited semantic map data is used in part to detect and avoid overlapping of spawned objects and to determine a correct position for a spawned object (e.g., based on predefined rules, machine learning, or other methods, for example to ensure a chair is not spawned hanging on a wall). In accordance with an embodiment, the selecting within operation 306 may be performed with a neural network or other method such as the waveform collapse algorithm.

In accordance with an embodiment, at operation 308 of the method 300, the populator module 126 analyzes existing objects within the local semantic map 206 (and possibly the composited semantic map 208), determines an object type (e.g., including an object description, properties or trait data, and related semantic data) to place at the selected cell and adds an object placeholder to the local semantic map 206 at the selected cell. The object placeholder including data describing the determined object type (e.g., including one or more traits, a volume size, a position, and an orientation for a potential object that may occupy the cell (e.g., as determined by the populator module 126 in operation 308). The one or more properties or traits providing semantic information regarding the potential object. For example, based on the local semantic map being of a "bedroom" type associated with a bedroom populator object, the populator module 126 may determine to insert an object placeholder with trait "desk" at a specified location (e.g., up against a wall by a window within the bedroom populator object), and with a specified size (e.g., a desk size that fits under the window). In accordance with an embodiment, the populator module 126 may not specify an exact digital object to place within a cell of the plurality of cells of the semantic map, but rather the populator module 126 may specify properties or traits for an object to occupy the cell. In accordance with an embodiment, at operation 310 of the method 300, the cells and topology are examined to find any unpopulated cells. Based on finding an unpopulated cell, the method 300 returns to operation 306 to determine whether a new object placeholder should be added to the local semantic map 206 in the unpopulated cell.

In accordance with an embodiment, at operation 312 of the method 300, based on there being no unpopulated cells, or based on operation 306 determining that there are no available spawning positions (e.g., cells), the populator module 126 may wait for an input. The input may originate from a user 102 via a user interface of a content generation tool (e.g., creating an environment with one or more populators). The input may include instructions requesting one or more of the following: a clearing of the local semantic map (e.g., or a clearing of the composited semantic map), a shuffling of the local semantic map (or composited semantic map) wherein existing objects on a semantic map are shuffled around into a new configuration or wherein the semantic map is cleared and new objects with a new layout are suggested, a change of topology within the environment (e.g., a change of topology of a populator), manipulation of an object (e.g., by a user), and more. Operations performed by the populator module 126 and the semantic map compositor 128 for the clear and shuffle requests are described below with respect to operation 330 and 330A. Operations performed by the populator module 126 and the semantic map compositor 128 for the change of topology are described below with respect to operation 332 and operation 334. Operations performed by the populator module 126 and the semantic map compositor 128 for the object manipulation are described below with respect to operation 336.

In accordance with an embodiment, at operation 330 of the method 300, a shuffle request may be received by the populator module 126 (e.g., via the user interface 202). The shuffle request being a request to shuffle objects within the local semantic map 206 (or the composited semantic map) and accordingly shuffling the associated digital objects within the populator object in the environment (e.g., to create a new layout of objects within the populator object). At operation 330A of the method 300, as part of an operation to perform the shuffle, the semantic map compositor module 128 is directed to clear all the semantic data from the local semantic map 206. At operation 330B of the method 300, as part of an operation to perform the shuffle, the populator module 126 is directed to clear all instantiated objects in the populator object (e.g., in the environment). After operation 330A and 330B are complete, the method is redirected to operation 304 to begin to repopulate the semantic map and the populator objects in the environment.

In accordance with an embodiment, as part of operation 330A of the shuffle, the populator module 126 may first save, and then remove all the semantic data from the local semantic map 206, before looping through performing operation 306, operation 308, and operation 310 using only the removed and saved objects (e.g., in order to provide a layout shuffle that includes the removed objects). The saved data may include at least a list of all objects (and associated data) within the local semantic map removed by the shuffle. In accordance with an embodiment, at operation 330 of the method 300, the received shuffle request may also be applied to nested child populators. For example, a second populator within a first populator may be forced to shuffle (e.g., via operation 330) based on the first populator being forced into a shuffle (e.g., by a user).

In accordance with an embodiment, at operation 332 of the method 300, a change of topology is detected and data describing the change in topology is received by the populator module 126 (e.g., via the user interface 202). The change in topology may come from a user manually changing the topology of the environment or of a populator object. For example, a user may change a topology (e.g., with a UI tool) of an environment from a flat plane topology to a mountainous topology. As another example, a user may modify a shape of a populator object such as a desk or room which may require an updating of an associated semantic map (e.g., and instantiated objects within the populator object). In accordance with an embodiment, the change in topology may come from an execution of code. In accordance with an embodiment, the change in topology may lead to a change in the local semantic map 206 (e.g., during operation 334), a change in the composited semantic map 208 (e.g., during operation 334), a change in layout of existing instantiated objects, an addition of instantiated objects (e.g., during operation 406) and a removal of instantiated objects (e.g., during operation 405). At operation 334, based on receiving data describing the change of topology, the semantic map compositor module 128 updates the local semantic map (and the composited semantic map) to include the new topology (e.g., via operation 420 and subsequent operations as described in reference to FIG. 4). The updating including changing (e.g., as described with reference to FIG. 4) aspects of the local semantic map (and the composited semantic map) to ensure consistency with overlapping and intersecting objects in the local semantic map (and the composited semantic map). In accordance with an embodiment, during or after the updating, the populator module 126 moves, adds or removes instantiated objects according to the updated composited semantic map. In accordance with an embodiment, after the semantic map compositor 128 updates the local semantic map (and the composited semantic map), and the populator module 126 moves instantiated objects within the environment accordingly, the populator module 126 returns to operation 310.

In accordance with an embodiment, at operation 336 of the method 300, a change or manipulation of a previously spawned (e.g., instantiated) object is detected, and data describing the change or manipulation of the previously spawned object is received by the populator module 126 (e.g., via the user interface 202). For example, the change or manipulation may be performed by a user 102 while moving or changing the object within the environment or within a populator object (e.g., using a mouse, touchscreen or other input device). The change or manipulation may also be performed by an execution of code. At operation 338, based on receiving data describing the change or manipulation of the previously spawned object, the semantic map compositor module 128 updates the local semantic map (and the composited semantic map) with data describing the change (e.g., via operation 400B and subsequent operations as described in reference to FIG. 4). The updating including changing cell data of the local semantic map (and the composited semantic map) to ensure consistency with overlapping and intersecting objects (e.g., objects that may be overlapping or intersecting due to the change) in the semantic map as described with reference to FIG. 4. In accordance with an embodiment, during or after the updating, the populator module 126 moves, adds or removes instantiated objects according to the updated composited semantic map.

After the semantic map compositor 128 updates the local semantic map (and the composited semantic map) and the populator module 126 moves instantiated objects within the environment accordingly, the populator module 126 may return to operation 310.

In accordance with an embodiment, and shown in FIG. 4, is a method 400 for compositing a semantic map with a semantic map compositor 128. The semantic map compositor module 128 reconciles each semantic map of the plurality of local semantic maps 206 into a single composited semantic map (e.g., a ground truth for an environment that may include a plurality of populator objects). In accordance with an embodiment, the semantic map compositor 128 analyzes the resulting composited map and selects one or more asset(s) to spawn within the environment to occupy a volume represented by the map (e.g., within a populator object). More specifically, the semantic map compositor method 400 combined with the populator method 300 (described in reference to FIG. 3) creates a layout within the composited semantic map, and a spawning system within the semantic map compositor module analyzes the composited semantic map, wherein the analyzing includes matching traits and associated volumes within the map to one or more digital assets for selection, and instantiating the one or more selected digital assets in the environment. The selected digital assets may be stored in and retrieved from the digital asset database 130. In accordance with an embodiment, some assets within the digital asset database may be smart assets that include semantic data that may describe behaviors.

In accordance with an embodiment, based on the semantic map compositor module 128 having a complete global picture of populator and nested populator context for an environment (e.g., via associated local semantic maps 206 and a composited semantic map 208), the semantic map compositor module 128 performs intelligent determinations about instantiating objects into an environment (e.g., using the method 400 described in FIG. 4). For example, based on a nested cabin populator object being within a forest populator object within a 3D environment, the semantic map compositor module 128 can determine (using the method 400) that an object requested by the nested cabin populator will exist in a forest (e.g., the forest populator module) and can make an intelligent determination regarding a spawned object (e.g., the object may be something typically found in a cabin within a forest). The intelligent determination is made as described below with respect to the operations in FIG. 4 and uses (at least in part) traits associated with cells and populators. For example, a plurality of populator objects in an environment (e.g., a cabin populator object and a forest populator object) can contribute to a same composited semantic map 208 which is then used (e.g., at operation 406) to spawn a digital object in the environment that may be compatible with semantic information provided by the plurality of populator objects.

Returning to FIG. 4, in accordance with an embodiment, at operation 401 of the method 400, the semantic map compositor module 128 receives data describing one or more of the following: a new object created by a populator (e.g., from operation 400A), a new instantiated object in the environment (e.g., from operation 400B), and a modification of an object in the environment (e.g., from operation 400B). In accordance with an embodiment, at operation 402 of the method 400, the semantic map compositor module 128 checks (e.g., compares) placement and traits of the new or modified object against the composited semantic map 208. The checking including a verification of object overlapping or intersecting with existing objects in semantic layers of the composited semantic map 208. In accordance with an embodiment, based on no overlapping or intersecting being discovered, the semantic map compositor module 128 performs a negative space test as described with respect to operation 408 below.

In accordance with an embodiment, at operation 404 of the method 400, based on an overlap or intersection being discovered, the semantic map compositor module 128 performs an analysis on priority between the new or modified object and existing objects in the composited semantic map 208. In accordance with an embodiment, a local semantic map 206 (and all associated objects therein) from a populator module 126 may have an associated priority whereby objects within a first local semantic map 206 from a first populator module 126 with a high priority will override objects within a second local semantic map 206 from a second populator module 126 with a lower priority. In accordance with an embodiment, a semantic map (e.g., either a local semantic map 206 or a composited semantic map 208) may include priority layers with each layer having an associated priority value. For example, objects in layers with higher priority will override objects in layers with lower priority within a single semantic map such that the objects in the lower priority layer will not appear (e.g., be instantiated) within an environment unless there is no conflicting (e.g., overlapping or intersecting) object in a higher priority layer. In accordance with an embodiment, priority values for a semantic map (or for a layer within a semantic map) may be determined by predefined rules, heuristics, user input, machine learning, or more. For example, there may be a rule whereby an object that is manually placed within an environment (e.g., by a user via a user interface) has a highest priority and cannot be removed by the semantic map compositor module 128.

In accordance with an embodiment, at operation 406 of the method 400, based on the new, modified or requested object having a higher priority, the semantic map compositor module 128 adds the placeholder object (e.g., from operation 308) to the composited semantic map 208 and uses all semantic and contextual data (e.g., within the composited semantic map 208) to select a specific digital asset to instantiate in the environment (e.g., from the digital asset database 130). The specific digital asset including data describing a 3D model (e.g., including mesh data, material data, animation data, and the like) of a digital object (e.g., such as a digital asset representing a digital object of a chair, or a bed, or a lamp, or any other digital object). For example, consider a first cabin populator object nested inside a second forest populator object, wherein the cabin populator object includes traits and additional semantic data associated with a cabin (e.g., data describing a cabin as a small shelter, structure or house, typically made of wood, typically in a forested or remote area, and more) and is responsible for adding digital objects associated with a cabin to the cabin populator object within an environment, and wherein the forest populator object includes traits and semantic data associated with a forest (e.g., a wooded area, can include trees, bushes, rocks, streams, animals, insects, and more) and is responsible for adding digital objects associated with a forest to a forest populator object within the environment. In the example, as part of operation 406, based on the cabin populator object requesting (e.g., in operation 308) a rug digital asset to be placed at a location within the cabin populator object, the semantic map compositor uses information regarding the nesting of the cabin populator within the forest populator (e.g., that the requested rug is for a cabin in a forest), to determine an appropriate rug digital asset (e.g., a digital asset of a rug which has semantic data (e.g., such as style data) associating it with a forest). Furthermore, the forest populator object may have additional semantic information describing a type of forest, or a location of the forest (e.g., country), and due to the nesting of the two populators, the cabin populator may use the additional contextual information (e.g., semantic data) to determine an appropriate rug asset (e.g., a rug which may be common in a country or type of forest).

In accordance with an embodiment, at operation 405 of the method 400, based on the new, modified or requested object not having a higher priority, the semantic map compositor module 128 may perform one or more of the following: remove the object from the local semantic map 206, remove the object from the composited semantic map 208, remove the object from the environment (e.g., remove an instantiated object), and perform a negative space test as described with respect to operation 408 (e.g., wherein a negative space may be a cell in a topology wherein an object has been removed). In accordance with an embodiment, at operation 425, the semantic map compositor 128 may record the removal of objects from the environment or from a semantic map (e.g., either a local semantic map 206 or a composited semantic map 208) for a potential reintroduction into the semantic map and/or a re-instantiation into the environment as described below with respect to operation 430.

In accordance with an embodiment, at operation 408 of the method 400, the semantic map compositor 128 checks for negative space within the local semantic map or the composited semantic map. The negative space including any area or volume (e.g., one or more cells) within a semantic map which has been cleared of an object and can receive a new object. Based on a lack of a topology cell negative space, the semantic map compositor module 128 waits for a next event (e.g., receiving a request for a shuffle (operation 330), a populator being deleted, a populator being added, a change in topology (operation 332), an addition, deletion or modification of an instantiated object in the environment (operation 336)).

In accordance with an embodiment, at operation 410 of the method 400, based on a finding of a topology cell negative space, the semantic map compositor module 128 evaluates one or more local semantic maps 206 intersecting the topology cell of the negative space for the possibility of adding an object to the negative space. The evaluation includes both an overlap analysis and a priority analysis for objects that are within topology cells of the one or more local semantic maps which are associated with (e.g., mapped to) the topology cell of the negative space. Based on a negative result of the evaluation (e.g., no object found in any of the one or more local semantic maps within a topology cell associated with (e.g., mapped to) the topology cell of the negative space), no object is added and the module 128 waits for a next event (e.g., receiving a request for a shuffle (operation 330), a populator being deleted, a populator being added, a change in topology (operation 332), an addition, deletion or modification of an instantiated object in the environment (operation 336)).

In accordance with an embodiment, based on a positive result of the evaluation finding at least one object (e.g., finding at least one object in any of the one or more local semantic maps, the one object being within a topology cell associated with (e.g., mapped to) the topology cell of the negative space), a second evaluation may be performed to determine if the at least one object is an object that was previously removed (e.g., as recorded in operation 425). In accordance with an embodiment, at operation 430 of the method 400, based on the at least one object being a previously removed object, the previously removed object is returned to the environment (e.g., re-instantiated) with high priority. In accordance with an embodiment, based on the at least one object not being a previously removed object, and as described in reference to operation 406 above, an object from the at least one object is selected and added to the composited semantic map (e.g., and may be instantiated in the environment), wherein the selection includes a priority analysis (e.g., as in operation 404).

In accordance with an embodiment, the negative space evaluation in operation 408, and the subsequent addition of objects via operation 410, operation 430 and operation 406 provides a non-destructive method for populator modules 126 and semantic map compositor modules 128 to manage digital objects within an environment. The non-destructiveness may be based on a possible re-instantiation or addition of objects (e.g., within operation 430 and 406) that had previously been removed from a semantic map (e.g., within operation 405) due to a priority analysis (e.g., within operation 404) from an overlapping of two or more local semantic maps 206, wherein the re-instantiation or addition is driven by a change in the environment (e.g., a change in topology from operation 420), or a modification of objects in the environment (e.g., operation 400B, and more). The change in the environment may be based on a movement of a populator object, a deletion of a populator object, a modification of an object within a populator object, and the like. For example, based on two or more populator objects being moved such that they are no longer intersecting within an environment (or objects therein are no longer overlapping) a negative space is generated, and objects that had previously been deleted (e.g., within the composited semantic map and the environment) may come back into existence (e.g., be re-instantiated). This is a deterministic process (e.g., which may use the record of removed objects from operation 425) allowing for layouts and object positioning to change (e.g., via user input) without a loss of previous work. In accordance with an embodiment, the non-destructiveness may be based on a possible addition of objects (e.g., within operation 406) that had previously been removed (e.g., within operation 405) due to a priority analysis (e.g., within operation 404) from an overlapping of two or more local semantic maps 206, wherein the re-instantiation is driven by a change in the environment (e.g., a change in topology in operation 420), and/or a modification of objects in the environment (e.g., operation 400B, and more).

In accordance with an embodiment, at operation 420 of the method 400, the semantic map compositor 128 receives data describing a change in topology (e.g., due to a moving of a populator object within an environment or a change to the environment (e.g., switching from a city environment to a forest environment, manipulating a structure of the environment, and more) or other reason as described with respect to operation 334 from FIG. 3). Based on receiving the data describing the change in topology, at operation 420A, the semantic map compositor 128 attempts to map an old topology (e.g., a topology prior to the change in topology) to the new changed topology, wherein the mapping includes determining a link between a first cell from the old topology to a second cell from the new changed topology, and transferring data from the first cell to the second cell. In accordance with an embodiment, the link between the first cell and the second cell is based on a determination that the second cell represents the first cell within the new changed topology based on an analysis of the change in topology. In accordance with an embodiment, based on a successful mapping of the old topology to the new changed topology, the semantic map compositor 128 updates data (e.g., based on the change in the topology) for the composited semantic map 208 in a non-destructive manner (e.g., updating cell locations within the composited semantic map 208). In accordance with an embodiment, based on an overlap between the old topology and the new changed topology, a first cell from the old topology and a second cell from the new changed topology may have different local addresses (e.g., a cell reference number, a cell coordinate system number, or the like) but occupy the same spatial location in the environment, and the semantic map compositor 128 may determine that the topology change does not invalidate an asset placed at the location, and accordingly updates data associated with the asset rather than removing the asset (e.g., by changing a cell identification number or coordinate number). give an example here where the populator is moved, but the item should stay put based on the larger environment. In accordance with another embodiment, based on a change of topology associated with a populator object, the semantic map compositor 208 may test one or more objects in the composited semantic map 208 for inclusion in the new topology (e.g., by running the one or more objects through operation 402 and performing any necessary subsequent operations), and remove any object (e.g., removing from the composited semantic map 208 and/or removing from the environment) that fails the test.

In accordance with an embodiment, the systems and methods described herein may use artificial intelligence to learn user intentions and apply this learning to placement of digital objects. More specifically, using artificial intelligence in combination with the systems and methods described herein (e.g., the operations in FIG. 3 and FIG. 4), content placed in an environment within a populator object may react to, and be informed by, user actions. For example, an artificial intelligence agent may be trained using machine learning techniques on user interaction data (e.g., from a plurality of users on a plurality of user devices 104) that includes data from operation 336 (described with respect to FIG. 3), and wherein the training includes learning interaction patterns of human users with populator objects. The learning may include determining habits with respect to digital object movement and changing of digital objects performed by a user. In accordance with an embodiment, a trained AI agent may be used for example within operation 306, operation 308 and operation 406 to help determine a spawn position (e.g., a cell within a populator topology) and a spawn object. By incorporating artificial intelligence as described above, the a populator object and associated module 126 may react to user generated and manipulated content within an environment, whereby the populator uses the artificial intelligence (e.g., via a trained AI agent) to blend user authored content and its own internal placement methods (e.g., via the populator method 300 and the semantic map compositor method 400).

Figure 5:
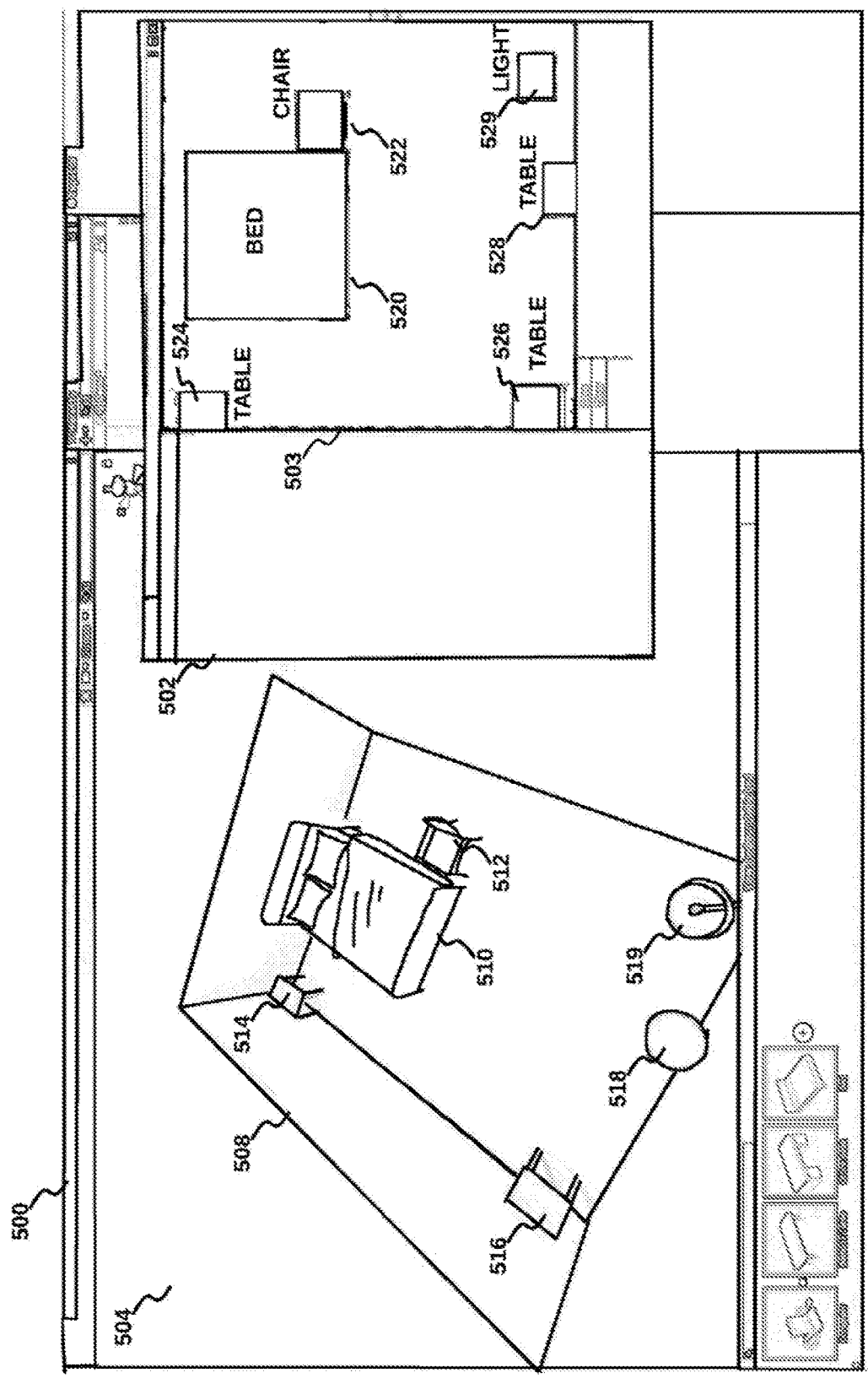
FIG. 5 is an illustration of a graphical user interface showing a populator object and a semantic map within an intelligent asset import and placement system, in accordance with an embodiment.

In accordance with an embodiment, and shown in FIG. 5 is an illustration of a graphical user interface 500 for an embodiment of a populator system 100. In accordance with an embodiment, the graphical user interface 500 may include a first display area 504 with a display of an environment (e.g., a 3D digital environment) that includes a bedroom populator object 508. The graphical user interface 500 may also include a second display area 502 that includes a top down display of a semantic map 503 associated with the bedroom populator object 508. Based on the methods described with respect to FIG. 2A, FIG. 2B, FIG. 3, and FIG. 4, a populator module 126 (not shown) uses the semantic map 503 to populate the populator object 508 with digital objects (e.g., from the digital asset database 130), wherein the populator module 126 is associated with the populator object 508. As shown in FIG. 5, a layout of objects in the semantic map 503 matches a layout of associated objects in the populator object 508, based on placement of the associated objects by the populator module 126 (e.g., according to the methods 300 and 400 described with respect to FIG. 3 and FIG. 4). For example, data describing a bed at a first location 520 on the semantic map 503 corresponds to a digital object of a bed 510 in the populator object 508. Similarly, data describing a light at a second location 529 on the semantic map 503 corresponds to a digital object of a light 519 in the populator object 508, and data describing a chair at a third location 522 on the semantic map 503 corresponds to a digital object of a chair 512 in the populator object 508. Similarly, data describing a first, second and third table at locations 524, 526, and 528 on the semantic map 503 correspond to digital objects of a first, second and third table 514, 516, and 518 respectively, in the populator object 508. As shown in FIG. 5, the semantic map 503 may include and display at least size, orientation, and a description of each item within the semantic map 503. In accordance with an embodiment, the graphical user interface may include tools which allow for an object within the populator object 508 to be directly manipulated (e.g., by a user via a mouse tool), and wherein the semantic map 503 adapts to the manipulation as described in operation 336 in FIG. 3.

Figure 6A:
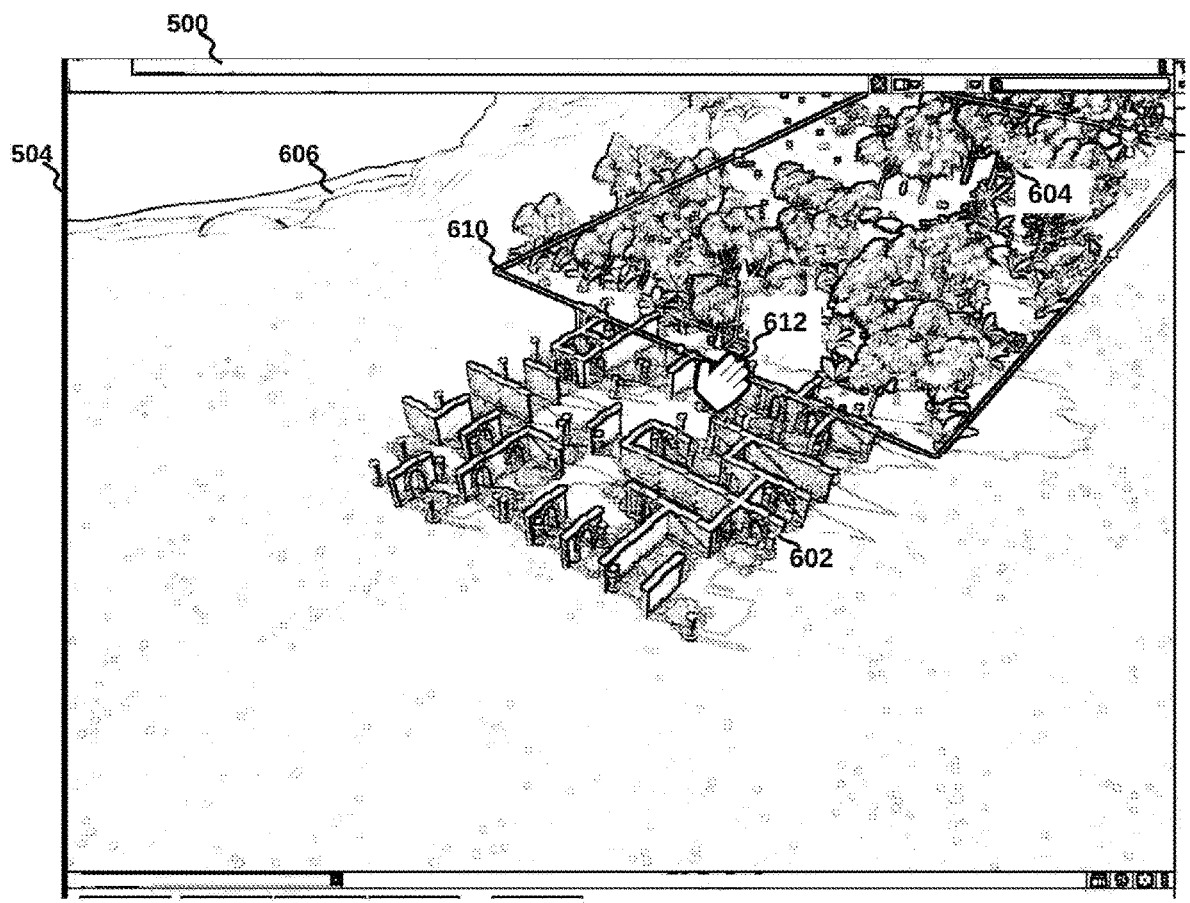
FIG. 6A is an illustration of a graphical user interface showing a first part of an interaction of two overlapping populator objects within an environment using an intelligent asset import and placement system, in accordance with an embodiment.
Figure 6B:
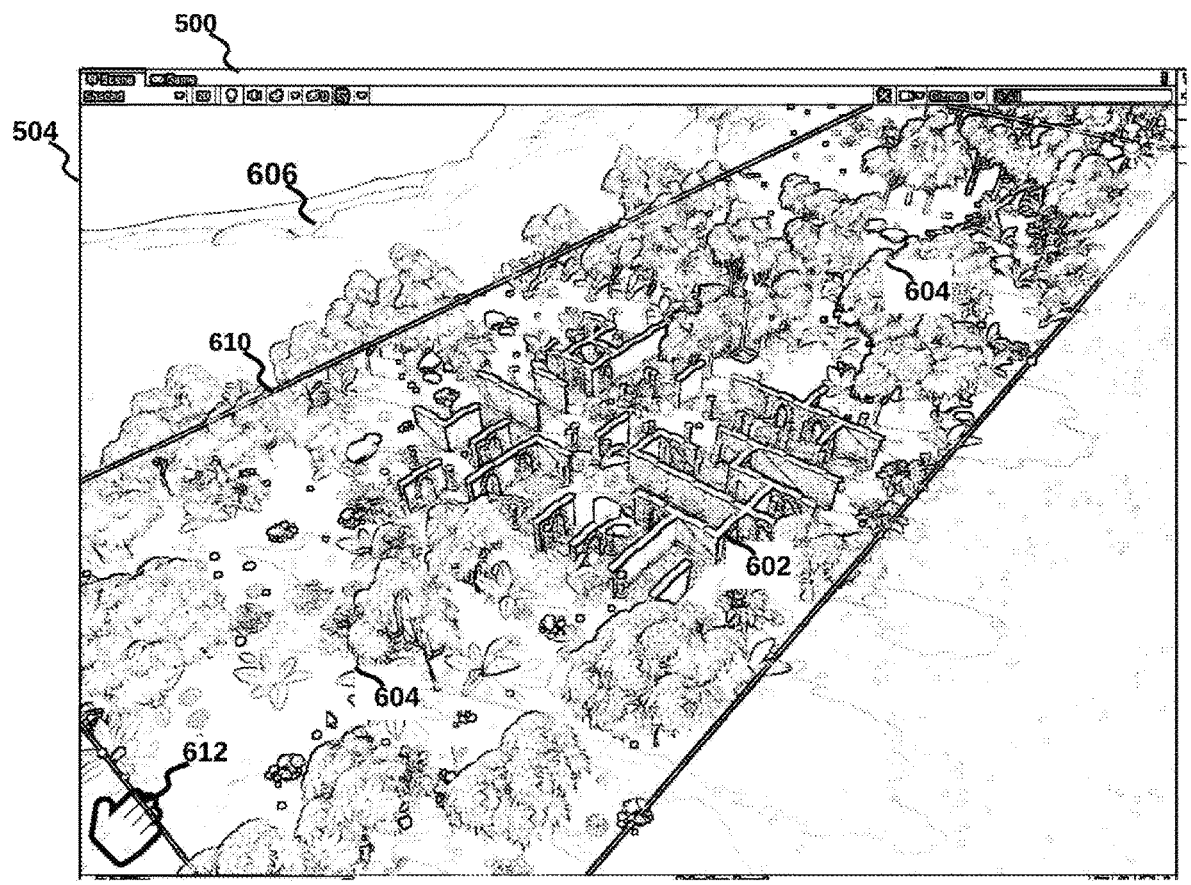
FIG. 6B is an illustration of a graphical user interface showing a second part of an interaction of two overlapping populator objects within an environment within an intelligent asset import and placement system, in accordance with an embodiment.

In accordance with an embodiment, and shown in FIG. 6A and FIG. 6B is an illustration of an interaction of two overlapping populator objects in an environment. Referring to FIG. 6A, there is shown the first display area 504 within the graphical user display 500 showing an additional environment 606 that includes a forest populator object 604 and a ancient ruins populator object 602, wherein the forest populator object 604 has a first associated local semantic map 206 and the ancient ruins populator object 602 has a second associated local semantic map 206. The forest populator object 604 populates an area of the environment (e.g., an area within a boundary of the object 604) with digital objects associated with a forest (e.g., trees, bushes, rocks and the like) according to the first associated local semantic map and the methods 300 and 400 as described with respect to FIG. 3 and FIG. 4. Similarly, the ancient ruins populator object 602 populates an area of the environment (e.g., an area within a boundary of the object 602) with digital objects associated with ancient ruins (e.g., broken walls, pillars, gravel roads, and the like) according to the second associated local semantic map and the methods 300 and 400 as described with respect to FIG. 3 and FIG. 4. In accordance with an embodiment, the forest populator object 604 is in a selected mode as shown by a selection rectangle 610 on the boundary of the object 604 and a displayed user interface tool 612. As shown in FIG. 6A, the forest populator object 604 is next to the ancient ruins populator object 602.

Figure 6C:
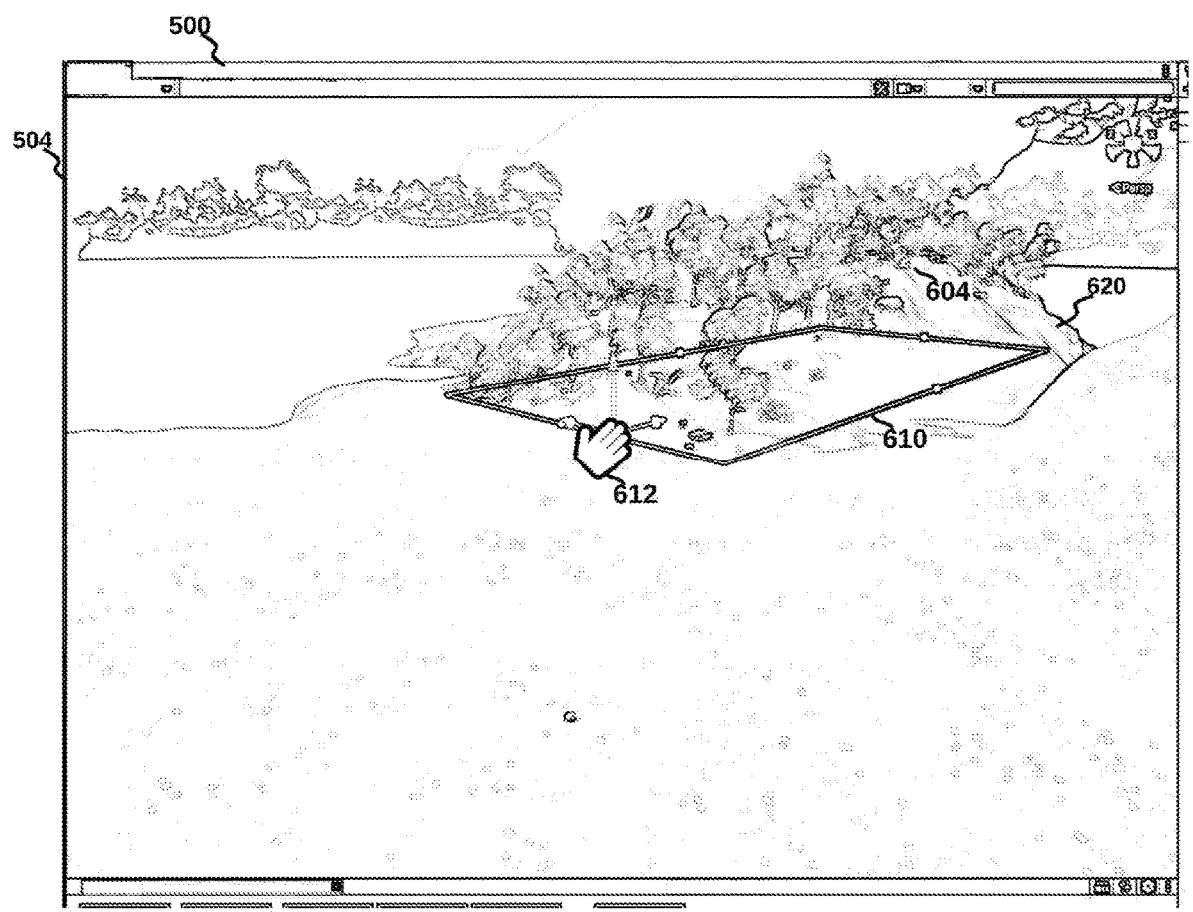
FIG. 6C is an illustration of a graphical user interface showing an interaction of a populator object with a mountainous topology within an intelligent asset import and placement system, in accordance with an embodiment.
Figure 6D:
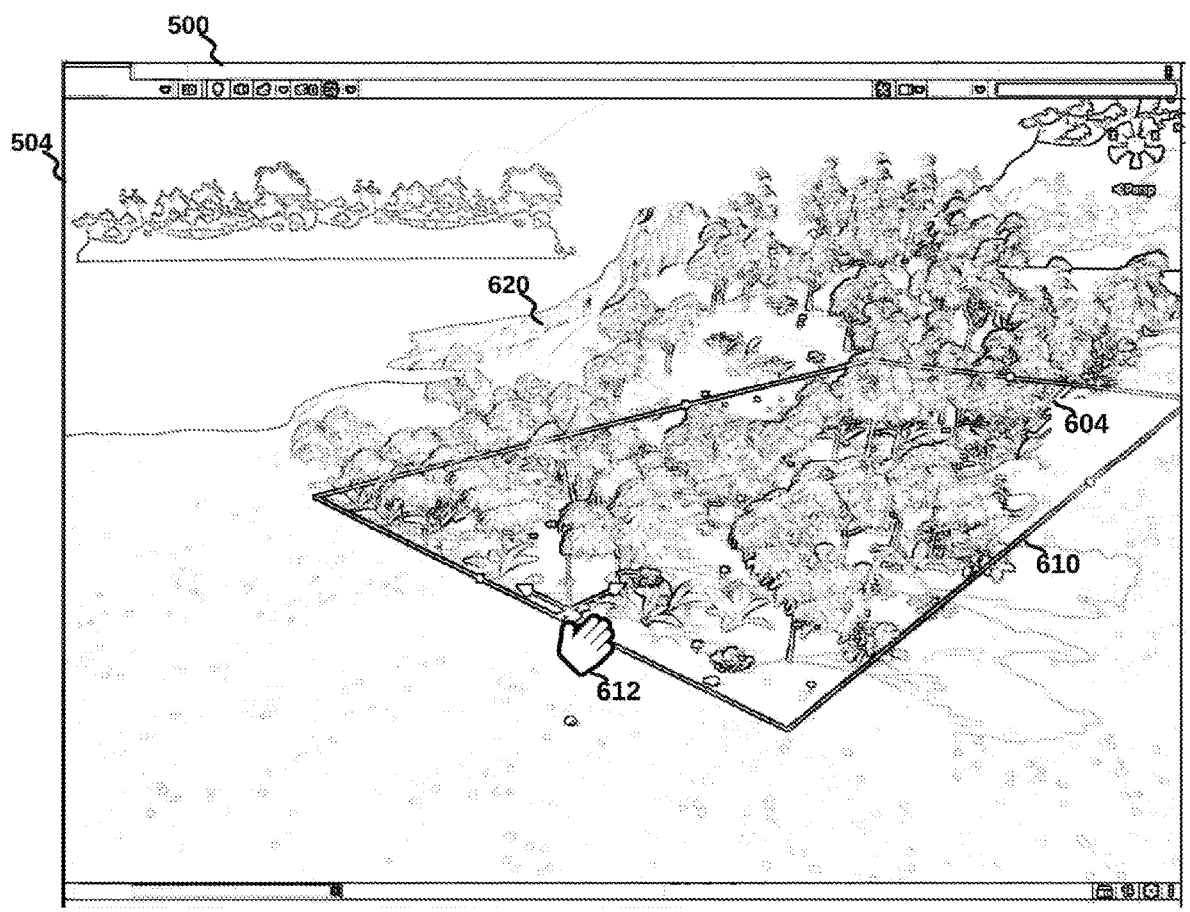
FIG. 6D is an illustration of a graphical user interface showing an interaction of a populator object with a mountainous topology within an intelligent asset import and placement system, in accordance with an embodiment.

In accordance with an embodiment, and shown in FIGS. 6C and 6D is an example of instantiated forest digital objects linked to the forest populator 604 adapting to a mountainous topology 620 based on the populator object 604 being dragged around the topology 620 by the UI tool 612. Accordingly, the forest digital objects adapt to the topology as it changes according to the description of operation 332 (including subsequent operations).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
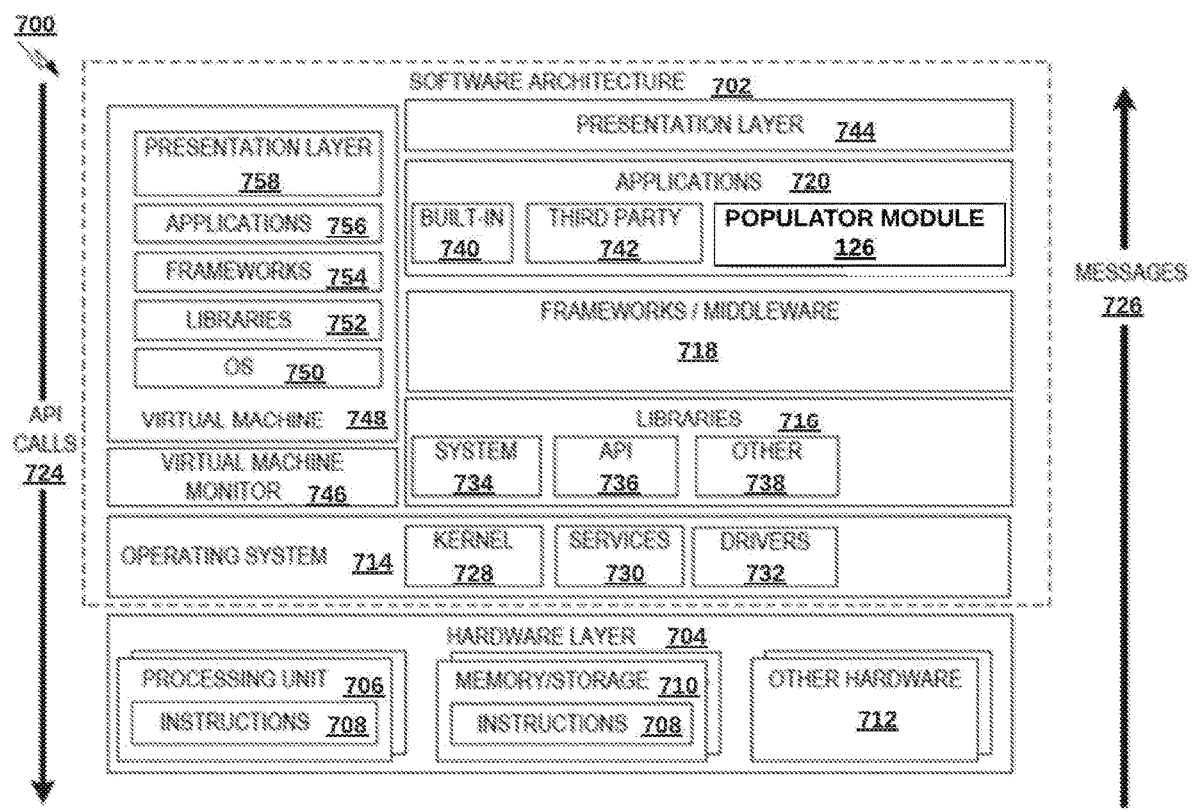
FIG. 7 is a block diagram illustrating an example software architecture, which may be used in conjunction with various hardware architectures described herein.

FIG. 7 is a block diagram 700 illustrating an example software architecture 702, which may be used in conjunction with various hardware architectures herein described to provide a gaming engine 701 and/or components of the intelligent asset import and placement (populator) system 100. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 7, this is illustrated by a virtual machine 748. The virtual machine 748 creates a software environment where applications/modules can execute as if they were executing on a hardware machine (such as the machine 800 of FIG. 8, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 8:
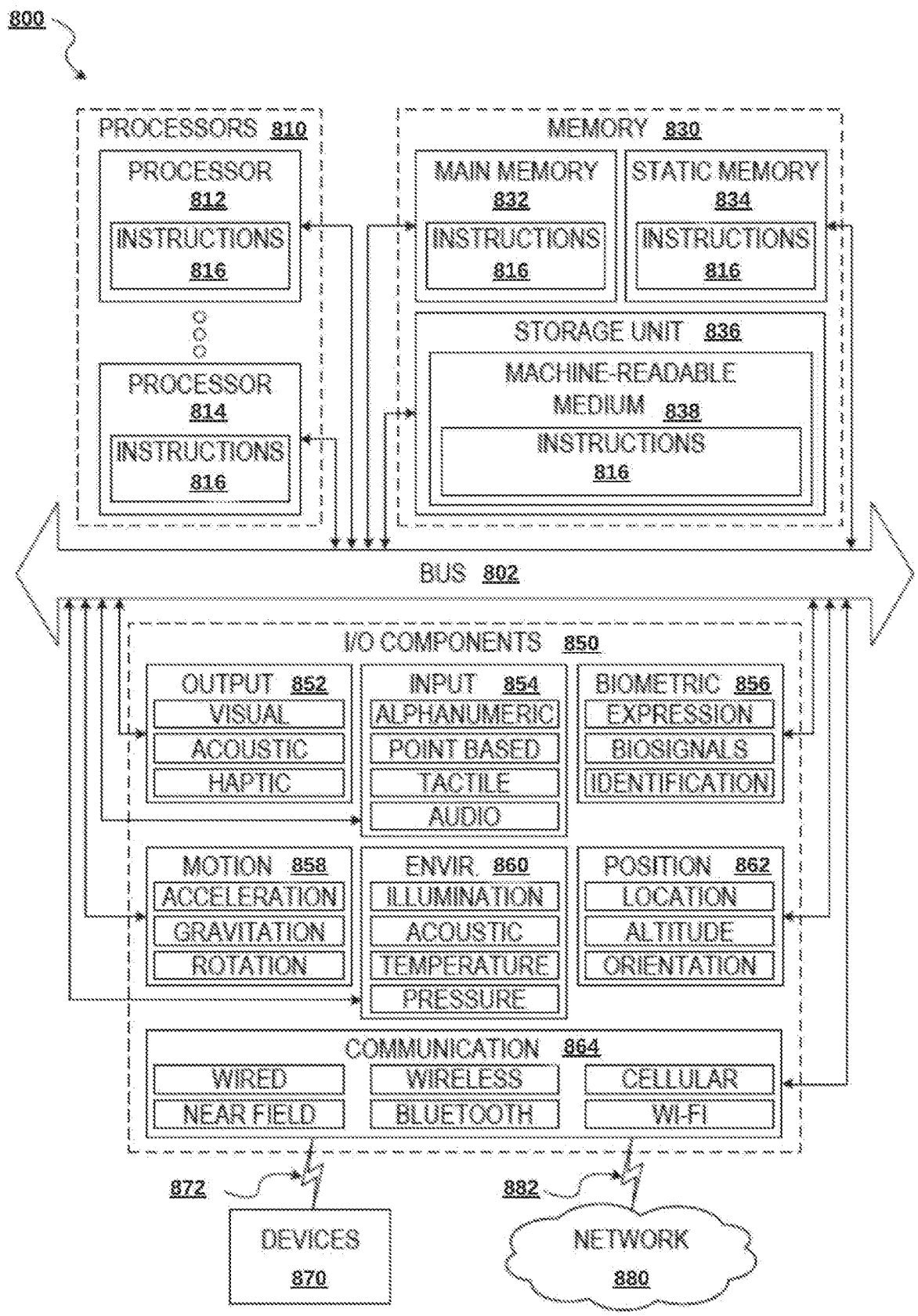
FIG. 8 is a block diagram illustrating components of a machine, according to some example embodiments, configured to read instructions from a machine-readable medium (e.g., a machine-readable storage medium) and perform any one or more of the methodologies discussed herein.

FIG. 8 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the user device 104. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 8. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like.

The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

We claim:

1. A system comprising:
   one or more computer processors;
   one or more computer memories;
   a set of instructions stored in the one or more computer memories, the set of instructions configuring the one or more computer processors to perform operations, the operations comprising:
   generating a semantic map representation of a digital object;
   generating an updated semantic map representation of the digital object based on a modification to at least one of a dimension of the digital object and a location of the digital object within an environment;
   dividing the semantic map into a first plurality of cells;
   dividing the updated semantic map into a second plurality of cells;
   mapping a cell in the first plurality of cells to a cell in the second plurality of cells based on a similarity of properties between the cell of the first plurality of cells to the cell in the second plurality of cells; and
   transferring data from the cell in the first plurality of cells to the cell in the second plurality of cells.

2. The system of claim 1, the operations further including:
   selecting a second digital object from a plurality of digital objects based on a matching of the second digital object to placeholder data or environment data, the environment data describing a digital environment into which the second digital object is placed;
   determining to perform an optional instantiating of the second digital object; and automatically placing the selected and instantiated second digital object at a selected cell within the first plurality of cells.

3. The system of claim 2, wherein the selecting of the second digital object is based on application of a machine-learned model trained by previous manual user actions.

4. The system of claim 2, wherein the semantic map representation includes a topology associated with an intersection of the environment and the digital object, and the selecting of the second digital object is additionally based on a matching of the second digital object to the topology.

5. The system of claim 2, the operations further comprising placeholder data in the semantic map representation, the placeholder data including properties corresponding to at least one of the digital object and the environment.

6. The system of claim 1, wherein the operations further include:
generating a semantic map representation of a second digital object;
assigning a first set of priorities to the semantic map representation of the digital object;
assigning a second set of priorities to the semantic map representation of the second digital object; and
compositing the semantic map representation of the first digital object and the semantic map representation of the second digital object into a single composited semantic map representation based the assigned first set of priorities and the assigned second set of priorities.

7. The system of claim 1, the operations further comprising selecting a target cell in the plurality of cells based on application of a machine-learned model trained by previous manual user actions.

8. A non-transitory computer-readable storage medium storing a set of instructions that, when executed by one or more computer processors, cause the one or more computer processors to perform operations, the operations comprising:
generating a semantic map representation of a digital object;
generating an updated semantic map representation of the digital object based on a modification to at least one of a dimension of the digital object and a location of the digital object within an environment;
dividing the semantic map into a first plurality of cells;
dividing the updated semantic map into a second plurality of cells;
mapping a cell in the first plurality of cells to a cell in the second plurality of cells based on a similarity of properties between the cell in the first plurality of cells to the cell in the second plurality of cells; and
transferring data from the cell in the first plurality of cells to the cell in the second plurality of cells.

9. The non-transitory computer-readable storage medium of claim 8, the operations further including:
selecting a second digital object from a plurality of digital objects based on a matching of the digital object to environment data, the environment data describing a digital environment into which the second digital object is placed;
determining to perform an optional instantiating of the second digital object; and
automatically placing the selected and instantiated second digital object at a selected cell within the first plurality of cells.

10. The non-transitory computer-readable storage medium of claim 9, wherein the selecting of the second digital object is based on application of a machine-learned model trained by previous manual user actions.

11. The non-transitory computer-readable storage medium of claim 9, the operations further comprising recording placeholder data in the semantic map representation, the placeholder data including properties corresponding to the digital object.

12. The non-transitory computer-readable storage medium of claim 8, wherein the semantic map representation includes a topology of a digital environment at an intersection of the digital environment and the second digital object.

13. The non-transitory computer-readable storage medium of claim 8, wherein the operations further include:
generating a semantic map representation of a second digital object;
assigning a first set of priorities to the semantic map representation of the digital object;
assigning a second set of priorities to the semantic map representation of the second digital object; and
compositing the semantic map representation of the first digital object and the semantic map representation of the second digital object into a single composited semantic map representation based the assigned first set of priorities and the assigned second set of priorities.

14. The non-transitory computer-readable storage medium of claim 8, the operations further comprising selecting a target cell in the plurality of cells based on application of a machine-learned model trained by previous manual user actions.

15. A method comprising:
generating a semantic map representation of a digital object;
generating an updated semantic map representation of the digital object based on a modification to at least one of a dimension of the digital object and a location of the digital object within an environment;
dividing semantic map into a first plurality of cells;
dividing the updated semantic map into a second plurality of cells;
mapping a cell in the first plurality of cells to a cell in the second plurality of cells based on a similarity of properties between the cell in the first plurality of cells to the cell in the second plurality of cells; and
transferring data from the cell in the first plurality of cells to the cell in the second plurality of cells.

16. The method of claim 15, the operations further including:
selecting a second digital object from a plurality of digital objects based on a matching of the digital object to environment data, the environment data describing a digital environment into which the second digital object is placed;
determining to perform an optional instantiating of the second digital object; and
automatically placing the selected and instantiated second digital object at a selected cell within the first plurality of cells.

17. The method of claim 16, wherein the selecting of the digital object is based on application of a machine-learned model trained by previous manual user actions.

18. The method of claim 15, wherein the semantic map representation includes a topology of a digital environment at an intersection of the digital environment and the second digital object.

19. The method of claim 15, wherein the operations further include:
generating a semantic map representation of a second digital object;

assigning a first set of priorities to the semantic map representation of the digital object;

assigning a second set of priorities to the semantic map representation of the second digital object; and compositing the semantic map representation of the first digital object and the semantic map representation of the second digital object into a single composited semantic map representation based the assigned first set of priorities and the assigned second set of priorities.

20. The method of claim 15, the operations further comprising selecting a target cell in the plurality of cells based on application of a machine-learned model trained by previous manual user actions.

* * * * *